United States Patent [19]

Bindon

[11] Patent Number: 4,806,007
[45] Date of Patent: Feb. 21, 1989

[54] OPTICAL GUN SIGHT

[75] Inventor: Glyn A. J. Bindon, Farmington Hills, Mich.

[73] Assignee: Armson, Inc., Farmington Hills, Mich.

[21] Appl. No.: 118,410

[22] Filed: Nov. 6, 1987

[51] Int. Cl.⁴ ............................................. G02B 27/34
[52] U.S. Cl. .................................... 350/569; 33/246; 350/562
[58] Field of Search ................. 33/245, 246; 350/562, 350/566, 569; 356/251, 252, 254

[56] References Cited

U.S. PATENT DOCUMENTS

| | | |
|---|---|---|
| 399,144 | 3/1889 | Grenfell . |
| 802,277 | 10/1905 | Fric . |
| 1,931,552 | 10/1933 | Maris . |
| 2,094,623 | 10/1937 | Stokey . |
| 2,162,723 | 6/1939 | Karnes . |
| 2,171,571 | 9/1939 | Karnes . |
| 2,430,469 | 11/1947 | Karnes . |
| 2,867,151 | 1/1959 | Mandler . |
| 2,955,512 | 10/1960 | Kollmorgen et al. ................. 33/246 |
| 3,098,303 | 7/1963 | Plisk . |
| 3,121,163 | 2/1964 | Rickert ................................ 350/566 |
| 3,161,716 | 12/1964 | Burris et al. ........................... 33/246 |
| 3,230,627 | 1/1966 | Rickert et al. . |
| 3,294,963 | 12/1966 | Carn . |
| 3,320,671 | 5/1967 | Rickert et al. ......................... 33/245 |
| 3,346,962 | 10/1967 | Luebkeman . |
| 3,362,074 | 1/1968 | Luebkeman et al. . |
| 3,481,658 | 12/1969 | Dietrich et al. ....................... 350/566 |
| 3,510,192 | 5/1970 | Akin, Jr. et al. ..................... 350/562 |
| 3,514,184 | 5/1970 | Vogl . |
| 3,552,819 | 1/1971 | Mandler . |
| 3,597,040 | 8/1971 | Gotoh ................................... 350/562 |
| 3,641,676 | 2/1972 | Knutsen et al. . |
| 3,645,635 | 2/1972 | Steck . |
| 3,672,782 | 6/1972 | Akin, Jr. . |
| 3,684,376 | 8/1972 | Lessard ................................ 350/562 |
| 3,777,404 | 12/1973 | Oreck ..................................... 33/245 |
| 3,782,822 | 1/1974 | Spence . |
| 3,820,248 | 6/1974 | Hayward ............................... 33/241 |
| 3,861,803 | 1/1975 | Sallans ................................ 356/254 |
| 3,897,158 | 7/1975 | Steck, III ............................ 356/251 |
| 3,905,708 | 9/1975 | Steck, III ............................ 356/251 |
| 3,918,813 | 11/1975 | Rossiter .............................. 356/153 |
| 3,938,875 | 2/1976 | Ruder . |
| 3,960,453 | 6/1976 | Svensson et al. .................... 356/252 |
| 3,963,356 | 6/1976 | Wiklund .............................. 356/251 |
| 3,991,500 | 11/1976 | Kershner et al. .................... 356/252 |
| 4,030,203 | 6/1977 | Ackerman, Jr. ...................... 33/241 |
| 4,136,963 | 1/1979 | Budden et al. ..................... 356/251 |
| 4,200,355 | 4/1980 | Williams, Jr. ....................... 350/562 |
| 4,214,371 | 7/1980 | Bush ..................................... 33/241 |
| 4,247,161 | 1/1981 | Unertl, Jr. ........................... 350/562 |
| 4,318,584 | 3/1982 | Ando et al. .......................... 350/562 |
| 4,380,876 | 4/1983 | Strassburg .......................... 356/247 |
| 4,576,451 | 3/1986 | Tominaga ............................ 350/566 |
| 4,643,542 | 2/1987 | Gibson ................................. 350/562 |
| 4,665,622 | 5/1987 | Idan ...................................... 33/246 |

Primary Examiner—John K. Corbin
Assistant Examiner—Martin Lerner
Attorney, Agent, or Firm—Harness, Dickey & Pierce

[57] ABSTRACT

An optical gun sight having a central axis for a hand gun, shot gun and/or rifle having a firing axis and with the gun sight having an image erector system located generally at the focal plane of the gun sight and with the gun sight including adjustment means operative on the image erector system for selectively moving the image erector system in two tranverse directions which are in turn transverse to the central axis to provide calibration of the position of the image of the target relative to the firing axis of the hand gun, shot gun or rifle whereby compensation can be provided for the trajectory of the bullet to the target.

34 Claims, 5 Drawing Sheets

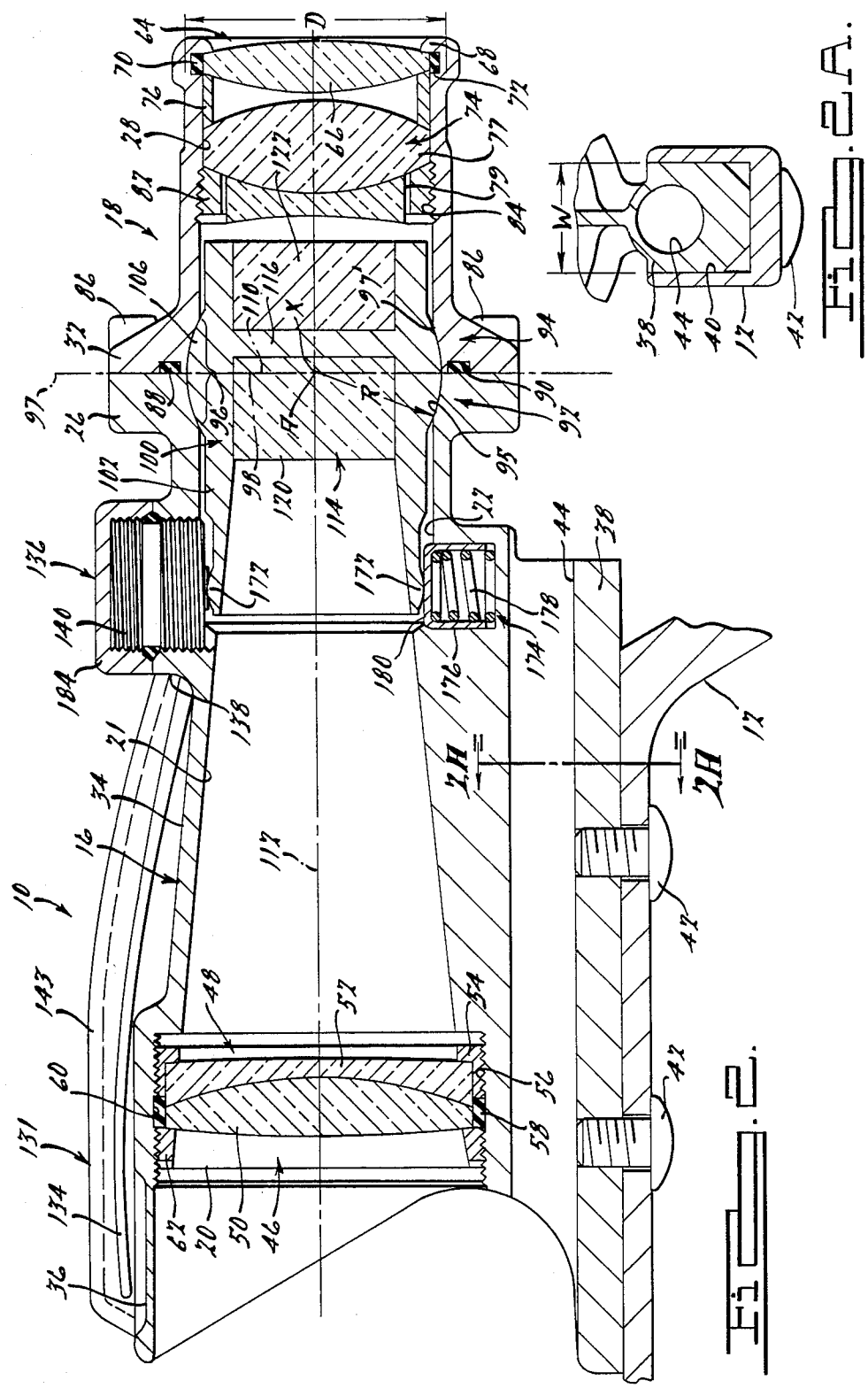

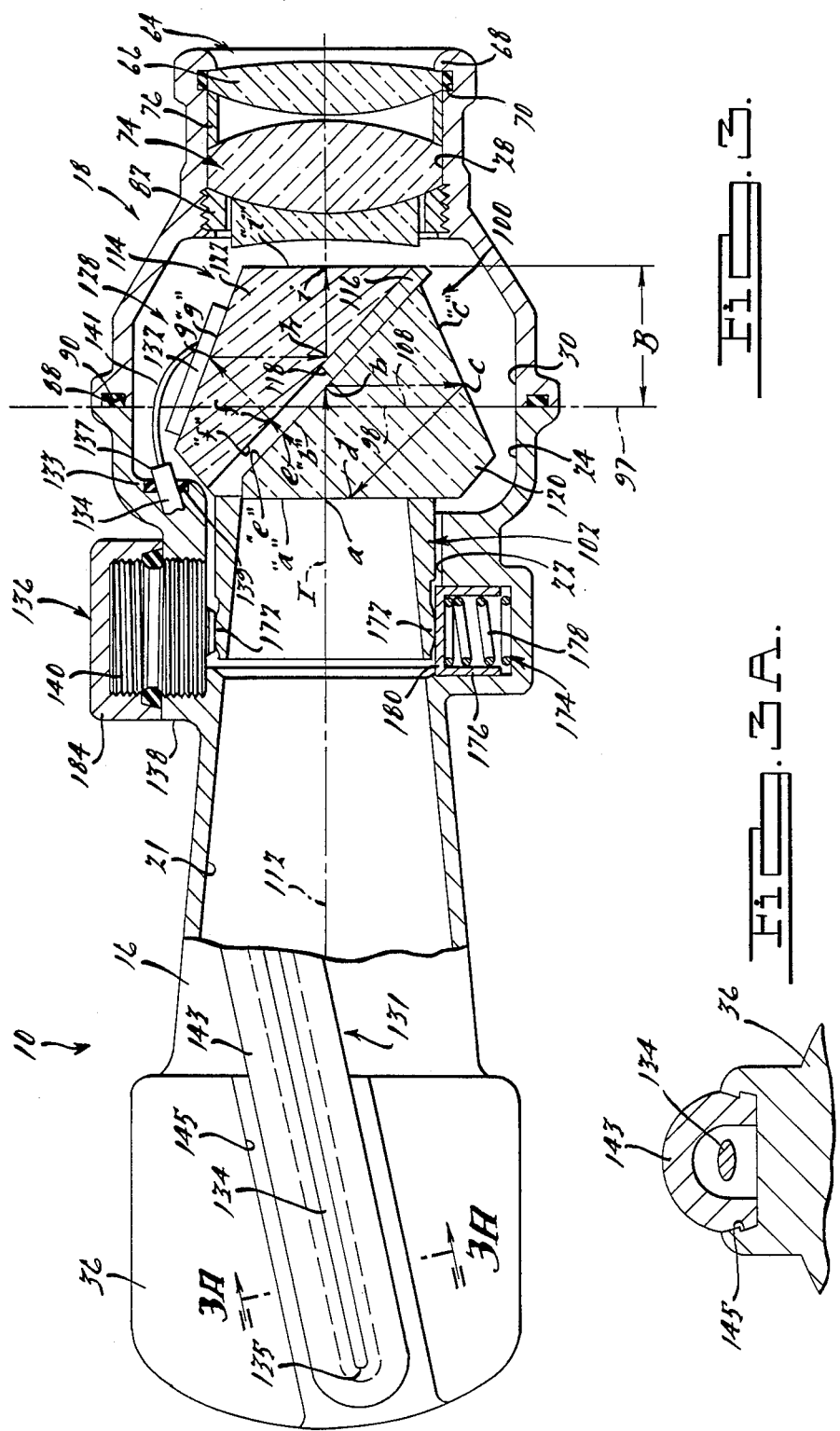

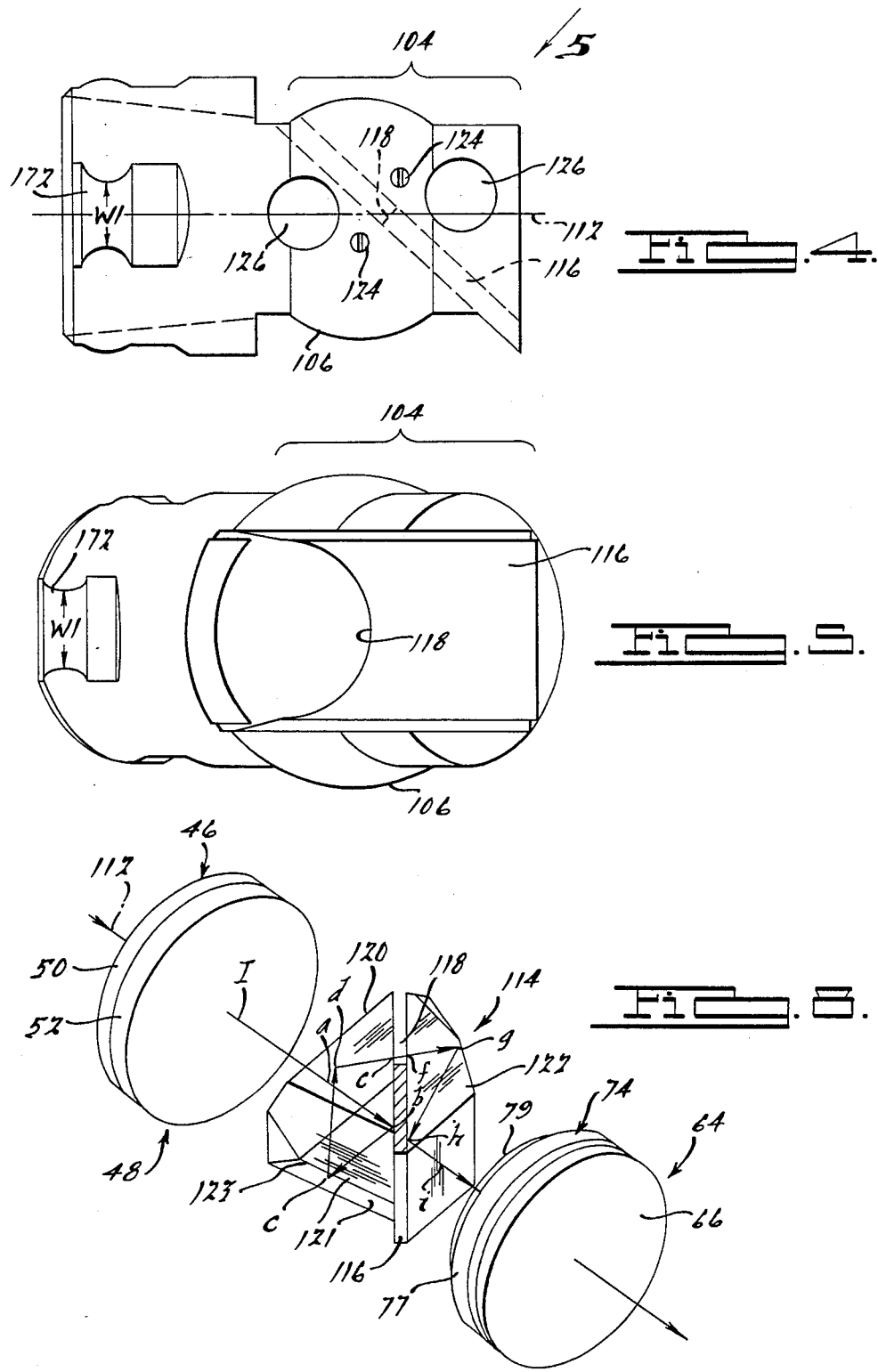

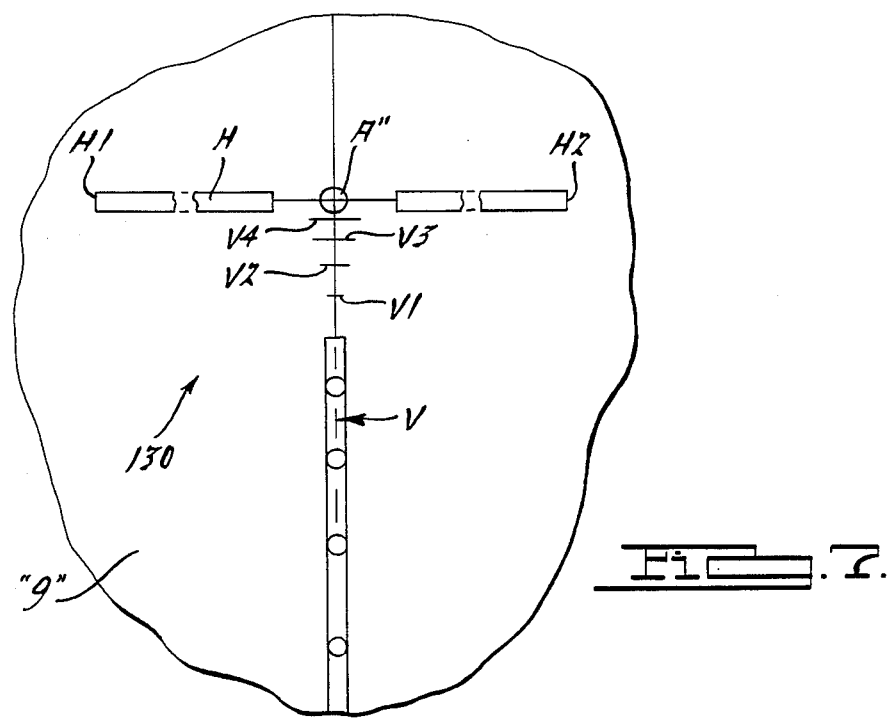
FIG. 7.
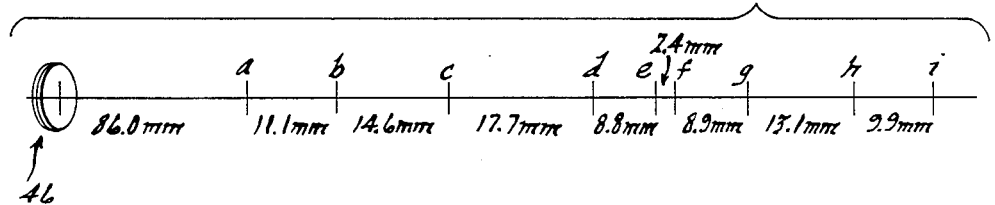
FIG. 9.
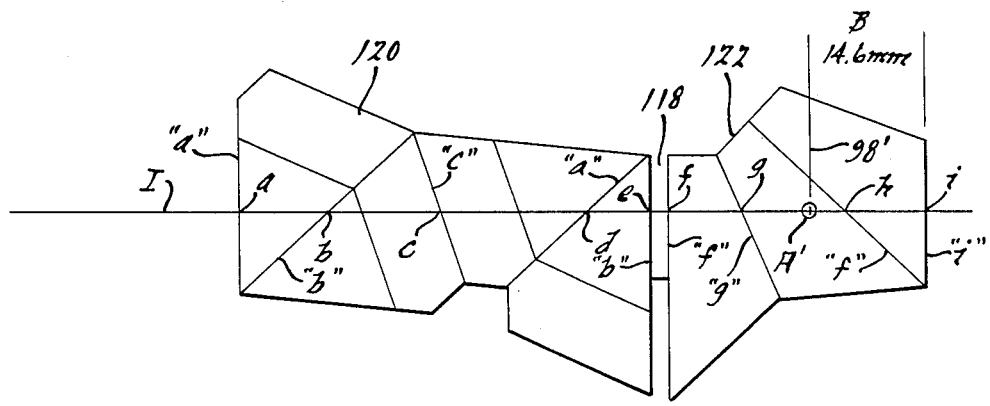

OPTICAL GUN SIGHT

SUMMARY BACKGROUND OF THE INVENTION

The present invention relates to optical gun sights for hand guns, shot guns or rifles and more particularly to an optical gun sight having internal adjustment means for providing sight and firing calibration and alignment.

Optical gun sights are commonly telescopic in nature, i.e. producing a magnified image of the target, and are provided with a reticle pattern which can be crosshairs, dots or other indicia which facilitates aiming of a rifle improving the accuracy of firing. These optical gun sights, however, are mounted on a rifle, usually above the barrel, and for this and other reasons require adjustment or calibration to provide alignment between the target sighted on the reticle pattern and the trajectory of the bullet to provide accuracy in firing.

Often the adjustment is provided by an external adjustment mechanism located between the optical gun sight itself and the mounting structure of the rifle. This adjustment mechanism permits movement of the optical gun sight vertically and horizontally to provide the desired movement of the reticle pattern and/or target relative to the central axis of the optical gun sight and hence relative to the axis of the barrel for calibration. The result is a relatively heavy and bulky construction. Other constructions in the past have provided for an internal adjustment effective with the sighting reticle pattern and/or image of the target via a spherical bearing but, because of the location of the components, have resulted in a lengthy, heavy construction.

In some instances optical gun sights are mounted on a handle like structure at the top of the rifle; this is provided to facilitate carrying the rifle by manually gripping the rifle by the handle and optical gun sight. However, the noted heavy, bulky and/or lengthy constructions tend to inhibit the ease of manual gripping at the handle and add to the overall weight of the rifle.

With the present invention an internal adjustment is provided for calibration and alignment via a spherical bearing assembly which operates both on an image erector system having a prism structure and on a reticle projecting structure for defining the reticle pattern, i.e. sighting crosshairs, dots, etc. The result is a relatively lightweight, compact structure. The optical gun sight is adapted to be mounted on an external handle on a rifle and, because of its light weight and compact size, facilitates manual gripping and carrying.

The optical gun sight of the present invention has means for day and night illumination of the reticle projecting structure for defining the reticle pattern and is of a construction facilitating such illumination.

Therefore it is an object of the present invention to provide a new and unique optical gun sight for a rifle (shotgun and/or hand gun) which has a novel internal adjustment for sight and firing calibration and alignment.

It is also an object of the present invention to provide such an optical gun sight where the internal adjustment is accomplished by a spherical bearing assembly operatively associated with an image erector system.

It is a further object of the present invention to provide such an optical gun sight where the internal adjustment is accomplished by manipulation of the image erector system and a reticle projecting structure for defining the reticle pattern for sighting.

It is another object of the present invention to provide an optical gun sight having an image erector system which has a reticle projecting structure formed therewith and where internal adjustment for sighting calibration is provided by simultaneous manipulation of the image erector system and reticle projecting system.

It is another object of the present invention to provide a new and unique optical gun sight for a rifle (shotgun and/or hand gun) which has an internal adjustment for sight and firing calibration and alignment and which is compact and generally lightweight.

It is still another object of the present invention to provide a new and unique optical gun sight for a rifle which is compact and generally lightweight and when mounted on a handle on a rifle facilitates gripping at the handle while minimizing the weight added by the gun sight.

It is another object of the present invention to provide a new and unique optical gun sight generally of the type noted and of a construction facilitating day and night illumination of the reticle projecting structure for defining the reticle pattern.

It is general object to provide a new and unique optical gun sight for a rifle (shot gun and/or hand gun) having features as previously noted and as further noted in the detailed description which follows.

Other objects, features, and advantages of the present invention will become apparent from the subsequent description and the appended claims, taken in conjunction with the accompanying drawings, in which:

FIG. 2 is a side, partially sectional view, to enlarged scale, of the optical gun sight of FIG. 1 taken generally along the lines 2—2 in FIG. 1;

FIG. 2A is a fragmentary sectional view taken generally along the lines 2A—2A in FIG. 2;

FIG. 3 is a top elevational view of the optical gun sight of FIGS. 1 and 2 with some parts shown broken away and others shown in section;

FIG. 3A is a sectional view of the day illumination structure of the optical gun sight of FIGS. 1-3 taken generally along the lines 3A—3A in FIG. 3;

FIG. 4 is a top elevational view to increased scale of a prism housing of the optical gun sight of FIGS. 1, 2 and 3;

FIG. 5 is a pictorial view of the prism housing of the optical gun sight of FIG. 4 taken generally in the direction of the Arrow 5 in FIG. 4;

FIG. 7 is a fragmentary view to enlarged scale of the reticle pattern provided by the reticle projecting structure of the optical gun sight of FIGS. 1, 2 and 3;

FIG. 8 is a pictorial view of the prism assembly of the optical gun sight of FIGS. 1, 2 and 3 and generally depicting the light path through the prism assembly; and FIG. 9 is a depiction of the light path through the prism assembly of FIGS. 1, 2 and 3 with the prism assembly shown in a developed, unfolded representation.

Figure 1:
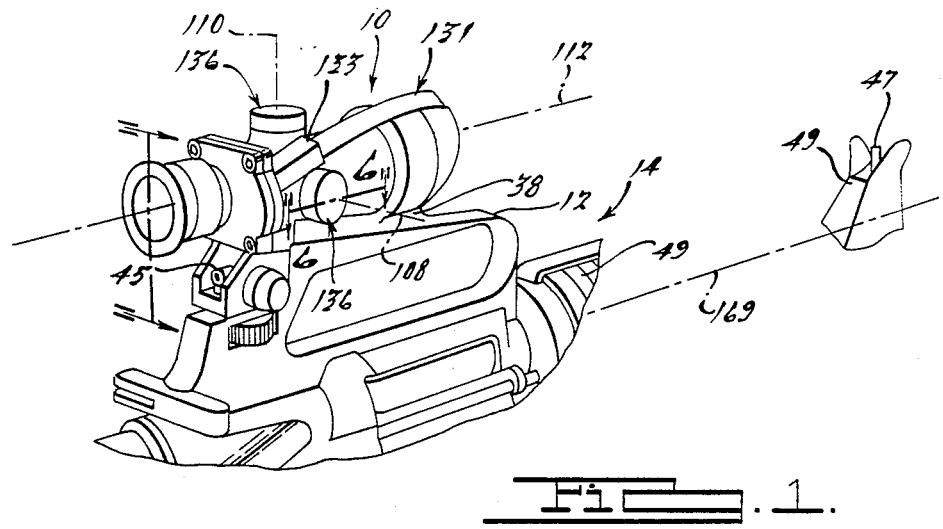
FIG. 1 is a pictorial partially fragmentary view depicting an optical gun sight of the present invention mounted upon a handle of a rifle with the rifle only partially shown.

Looking now to FIGS. 1-3, an optical gun sight 10 is shown mounted on a handle 12 of a rifle 14 (partially shown) and includes a housing assembly having a forwardly located main housing 16 and a rearwardly located eyepiece housing 18. The main housing 16 is tubular having an enlarged counterbore 20 at its forward end tapering rearwardly via a tapered bore 21 to a reduced diameter bore 22 which terminates in a generally transversely elliptical or oblong bore portion 24 at its inner end (see FIGS. 2 and 3). An external mounting flange 26 is located at the inner, terminal end of the main housing 16.

The eyepiece housing 18 is also tubular and defined by a generally straight cylindrical bore 28 at its rearward end which terminates at its forward end in a bore portion 30 which is generally transversely elliptical or oblong similarly to bore portion 24. The eyepiece housing 18 also has an external mounting flange 32 which is contoured similarly to main housing flange 26.

The body portion 34 of the main housing 16 in the area of the tapered bore 21 is also generally externally tapered or conical in shape. The eyepiece housing 18, except for the flange 32 and oblong bore portion 30, is generally of a straight cylindrical construction. An axially extending truncated portion 36 at the forward end of the main housing 16 defines a sun shade. The main housing 16 has a longitudinally extending mounting base 38 at its bottom side. The mounting base 38 is narrow and adapted to be received in a slot 40 in the handle 12 at the upper portion of the rifle 14 and is removably secured to the handle 12 by a pair of threaded bolts 42. In order to minimize the overall weight of the optical gun sight 10, the mounting base 38 is constructed with a width W no greater than around one third of the nominal outside diameter D of eyepiece housing 18 at its straight cylindrical portion. In addition, a bore 44 extends longitudinally through the base 38 to provide an opening through which the iron sights 45 and 47 at the rear and front of the barrel 49 of the rifle 14 can be viewed (see FIG. 1). Thus the iron sights 45 and 47 can be readily used in lieu of the lens system of the optical gun sight 10 without the need for removal of the optical gun sight 10 from the rifle 14. In addition the bore 44 acts as a lightening hole to further decrease the overall weight of the optical gun sight 10. Thus it can be seen that the main housing 16 and eyepiece housing 18 define a compact relatively streamlined contour of minimum size and weight.

An objective lens system 46 is located in the counterbore 20 at the forward end of the main housing 16 and includes a doublet lens 48 which comprises a generally double-convex lens 50 and a generally concave-convex lens 52 secured together by a suitable adhesive. The doublet objective lens 48 can be of a generally known construction the details of which do not constitute a part of the present invention and hence such details have been omitted for purposes of simplicity. The doublet objective lens 48 is partially surrounded and held in an annular support ring 54 which is threadably mounted in a rear threaded portion 56 of counterbore 20. An annular seal 58 extends around the forward periphery of the doublet objective lens 48 and engages a smooth bore portion 60 of the counterbore 20 to provide a seal therewith; a retaining ring 62 is threaded into a forward threaded portion 64 of the counterbore 20 and clamps the doublet objective lens 48 in place.

An ocular lens system 64 is located at the opposite end of the optical gun sight 10 and is assembled in the eyepiece housing 18 from its enlarged, flanged end. Thus the ocular lens system 64 includes an eyepiece singlet or generally double-convex lens 66 which is located against an annular radially inwardly directed lip 68 at the small diameter end of the eyepiece housing 18. An annular seal 70 in an annular groove 72 adjacent the lip 68 provides a seal around the periphery of the eyepiece lens 66. A doublet ocular lens 74 is located a selected axial distance from the singlet eyepiece lens 66 by an annular spacer ring 76. The doublet ocular lens 74 comprises a generally double-convex lens 77 and a generally double-concave lens 79 secured together by a suitable adhesive. The doublet ocular lens 74 can be of a generally known construction the details of which do not constitute a part of the present invention and hence such details have been omitted for purposes of simplicity. A retaining ring 82 is threadably secured in a threaded bore portion 84 and clamps the eyepiece lens 66, spacer 76 and doublet ocular lens 74 together generally in a fixed location. On the other hand the objective lens system 46 can be selectively axially moved to provide adjustment to position the focal plane of the image of the sighted target at the desired location relative to the image erection system to be described. Of course, the axial position of the ocular lens system 64 can be varied for individual needs simply by utilizing a selectively variable adjustment for changing the axial position of the lenses in that system.

As can be seen from the drawings, the main housing 16 and eyepiece housing 18 are secured together at their respective flanges 26 and 32 by a plurality of threaded fasteners 86. An annular seal 88 is located in a groove 90 and provides for a seal between the mating flange surfaces. The oblong portions 24 and 30 are formed with generally diametrically opposite circular, cylindrical portions 92 and 94, respectively. Spherically contoured seat portions 95 and 97' are formed in these opposite cylindrical portions 92 and 94 and together define a spherical seat 96 at the juncture of the main housing 16 and eyepiece housing 18; the center X of the radius R for the spherical contour of the seat 96 is in a transverse plane 97 defined by that juncture; as will be seen the transverse plane 97 is generally coincident with the effective focal plane 98 of the objective lens system 46 of the optical gun sight 10.

In order to present the viewed or final image of the sighted target to the eye with proper right to left and up and down orientation, an image erector system 100 is provided between he objective and ocular lens systems 46 and 64, respectively. As will be seen, the image erector system 100 also cooperates with the objective lens system 46 to optically locate the effective focal plane 98 with the properly oriented image of the sighted target at the desired position. The image erector system 100 is rotatably mounted within the spherical seat 96 and to this end is supported by a prism housing 102 (see FIGS. 4 and 5). The prism housing 102 is generally tubular and has a rearwardly extending radially open portion 104 formed with a generally spherically shaped bearing portion 106 adapted to be matably supported in the spherical seat 96 for rotational, adjustable movement about a horizontal axis 108 (FIG. 3) and a vertical axis 110 (FIG. 2) both extending transversely to the axis 112 of the objective and ocular lens systems 46 and 64, respectively. Note that both the horizontal axis 108 and vertical axis 110 are generally located in the effective focal plane 98.

The image erector system 100 includes a prism assembly 114 which is secured within the open portion 104 of the prism housing 102. A web or rib 116 extends diagonally from the closed side of the open portion 104 to the open side at the diametrically and axially opposite end of the open portion 104. The rib 116 is provided with a generally U-shaped opening 118 at its forward end for a purpose to be seen. The prism assembly 114 is preferably generally of a Schmidt or Pechan Z type and includes a roof prism 120 and a helper prism 122. The roof prism 120 and helper prism 122 are separated by a narrow air gap defined by the U-shaped opening 118 and hence are located in spaced relationship on opposite sides of the web 116. The prism assembly 114 has a generally elongated contour having its longitudinal dimension located in the major diameter areas of oblong bore portions 24 and 30 and hence the longitudinal dimension is generally horizontally oriented. The prism assembly 114 in cooperation with the objective lens system 46 determines the location of the effective focal plane 98 and is selected to locate it substantially in coincidence with the transverse plane 97 at which the center X of the radius R for the spherical seat 96 is located; hence the prism assembly 114 receives the image from the objective lens system 46 and through a series of reflections provides an erected, properly oriented focused image which in turn provides the final image to the eye of the viewer through the ocular lens system 64. The focused image can be considered to be generally at the effective focal plane 98. Thus, as will be seen, in calibrating the optical gun sight 10, the prism assembly 114 is rotated about two axes within the effective focal plane 98 whereby the image and reticle pattern are moved to provide the desired adjustment.

With binoculars or scopes using a Pechan type prism assembly, it is conventional practice to have the roof prism 120 and helper prism 122 arranged in a reverse order, i.e. the helper prism 122 is located closest to the objective lens system 46. With the present invention, however, the preferred orientation as shown locates the effective focal plane 98 within the confines of the prism assembly 114. Thus this preferred orientation facilitates calibration via an internal adjustment operating on the image erector system 100 and/or the prism assembly 114 and also facilitates in the design of an efficient ocular lens system permitting a compact structure.

The various reflections between the roof prism 120 and helper prism 122 are shown in FIGS. 3, 8 and 9. Thus the image I on axis 112 impinges surface "a" of roof prism 120 and being normal to the surface "a" passes through without reflection along line a-b until it hits surface "b". Here the image I is reflected along a direction b-c against surface "c" of the 'roof' segment 121 of prism 120. The surface "c" is actually the peak 123 of the 'roof' segment 121. Other rays of the image I along the axis 112 are at slight angles and/or displacements to this representation, but the surfaces of the 'roof' segment 121 coact with each other to reflect from one roof surface to the other and behave in effect as though reflecting at the peak 123. Image I is then reflected from the 'roof' segment of prism 120 in a direction c-d against surface "a". The image I is then reflected along the line d-e in a direction generally normal to surface "b" across air gap 118 in direction e-f and against and generally normal to surface "f" of helper prism 122. In this regard, the opening 118 of the rib 116 is made sufficiently large to permit transmission of generally the full image as received from the objective lens system 46 by the roof prism 120 to the helper prism 122. Image I then travels in a direction f-g against helper prism surface "g" which is a mirrored surface having a silver coating. The reticle pattern 130 of FIG. 7 is formed on the surface "g" by etching the pattern through the silver coating.

The roof prism 120 and helper prism 122 are constructed and located in conjunction with the objective lens system 46 such that the image I is substantially focused at mirrored surface "g" and has superimposed thereon the reticle pattern 130. Now the focused image I with the reticle pattern 130 superimposed thereon is reflected in a direction g-h against helper prism surface "f". From here the image I and reticle pattern are reflected in a direction h-i through helper prism surface "i" to determine the final image as viewed by the eye through the ocular lens system 64.

It can be seen that, by moving the prism assembly 114 with the prism housing 102 via the associated spherical bearing, the received image I of the target at the effective focal plane and the superimposed reticle pattern can be moved together to provide the desired calibration. As noted the image I is substantially in focus at the mirrored surface "g" and hence in a sense the mirrored surface "g" is at the focal length of the objective lens system 46 and can be considered to define a "prism focal plane". However, an unfolded analysis of the prism assembly 114 shows that the effective or 'air equivalent' focal plane 98 will be generally located at the plane 97. Generally the focal plane of the objective lens system 46 will be at the focal length of the objective lens system which is routinely determined considering the light to be traveling solely through air, i.e. no travel through glass as with prism assembly 114. The use of reflective prism surfaces, however, permits the optical gun sight to be considerably shortened while still providing the equivalent length or focal length for locating the focal plane. But since air and glass have different densities and indexes of refraction compensation must be made for the prism glass.

An analysis of the compensation for the travel of light in the prism assembly 114 of a sample of the present invention can be seen in FIG. 9. As noted the image I was focused at mirrored surface "g" however, the location of the effective focal plane 98 can be determined by analysis of the light path through the prism assembly 114 in its unfolded or developed representations. Thus, in FIG. 9, the roof prism 120 and helper prism 122 are shown in a developed or unfolded view with the light image I shown traveling in a straight line through the glass and narrow air gap e-f of the prism assembly 114. The distances a-b, b-c, c-d, d-e, f-g, g-h and h-i represent the distances traveled in glass by the light beam of image I. The distance e-f is the distance traveled in air across the air gap 118. The prism material for the helper prism 122 was Schott BaK 4 with a refractive index of 1.57. The prism material for the roof prism 120 was Schott BK7 with a refractive index of 1.52. The sum of the distances (g-h+h-i) from the mirrored surface "g" to the prism exit surface "i" was divided by the index of refraction for the glass and the equivalent distance B in air was determined to locate point X' which is the point at which the focused image I would be effectively located relative to the exit surface "i" and hence provides for a theoretical determination of the location of the effective focal plane 98 within the optical gun sight 10. The noted distances for one example of the present invention are shown in the scale in FIG. 9; with the noted distances being in millimeters, the distance B was 14.6 millimeters. When the distance B from surface "i" is applied to the actual prism assembly 114 (see FIGS. 3 and 9), the point A is located in coincidence with point X on the plane 97 which is the theoretical or effective focal plane 98 for the objective lens system 46. Note, however, that the mirrored surface "g", with the focused image and projected reticle pattern 130 thereon, is also located proximate to the plane 97 and to the effective focal plane 98. Thus the mirrored surface "g" with the focused image thereon and the effective focal plane 98 are located within the confines of the image erector system 100 and within the confines of the prism assembly 114.

The roof prism 120 and helper prism 122 are initially held in place on the prism housing 102 by set screws 124. After initial assembly, the roof prism 120 and helper prism 122 are permanently fixed to the prism housing 102 via a suitable adhesive applied at openings 126 in prism housing 102 (see FIG. 4). Note that the operative portions of reflective and transmitting surfaces of roof prism 120 and helper prism 122 are spaced from and are not engaged by their adjacent, confronting surfaces and similarly the operative portions of reflective and transmitting surfaces of roof prism 120 and helper prism 122 are spaced from and not engaged by the adjacent, confronting surfaces of the prism housing 102.

As noted the prism assembly 114 is integrally connected with a reticle projecting structure 128 and also as noted the surface "g" of the helper prism 124 is silver coated to provide a mirror surface. A portion of the silver coat is etched away to define the reticle pattern 130, i.e. crosshairs, dots, etc. During daylight sighting the reticle pattern 130 can be naturally illuminated as black lines, dots or other indicia to the viewer. For night sighting a source of illumination 132 is provided behind the surface "g". In one form, a radioactive red tritium lamp having a half life of 12.7 years was used to provide the reticle pattern 130 in red for night sighting; other radioactive materials could be used, i.e. green carbon fourteen. Alternatively a battery operated light source could be employed. For day lighting of the reticle pattern 130 a light transmitting optic system 131 can be utilized. Thus a thin molded rod 134 has its forward end 135 located at the forward end of main housing 16 proximate to the sunshade 36. The rod 134 can be made of translucent red acrylic light collecting and transmitting material such as Rohm and Haas #577 and will generally collect light along its entire exposed length; thus the rod 134 extends outside of the housing assembly for generally the full length of the main housing 16, i.e. greater than around 50% of the housing length and preferably between around 70% to 90% of that length. The transmitting end 137 of the rod 134 extends through a boss 133 in the main housing 16 with a seal 139 sealing its entry therein. The extended length of rod 134 exposed to daylight improves the efficiency of the daylight illumination. A flexible polymer fiber optic 141 communicates the light at the transmitting end 137 to the location of the source of night illumination 132. The rod 134 is located in and protected by a clear polycarbonate shield 143 which overlays the rod 134 and is located at its forward end in a notched channel 145 at the tip of the sunshade 36 (see FIG. 3A). Note that both the tritium lamp and the transmitting end of the fiber optic 141 are located behind the reticle pattern 130 etched on the back of mirror surface "g" to direct the reticle pattern 130 along the line g-h, the line of reflected image I, toward helper prism surface "f". In this way, day and night illumination can be provided to the reticle pattern 130.

The reticle pattern 130 is shown to include a series of crossed lines and dots which are etched in the silver coating on the back of prism surface "g" (FIG. 7). Note that with routine use of the rifle 14, the plane of mirrored prism surface "g" is substantially vertical and hence reticle pattern 130 will be substantially vertical with point A' being generally at point A in the effective focal plane 98. Thus in the pattern 130 the line V will extend vertically while the line H will extend horizontally on the prism surface "g". Note that since the mirror surface "g" and hence the horizontal line H is skewed relative to the axis 112 there can be some parallax and difference in clarity of the focus between the extreme positions H1 and H2 of the image of the target at the mirror surface "g". This can be partially compensated by generally locating the ocular lens system 64 to be slightly, but generally imperceptibly, out of focus relative to point A whereby the image at points H1 and H2 will be generally viewed with the same clarity. Importantly, however, the vertical sighting line V will substantially not suffer from parallax. This permits the use of gradation lines V1-V4. These gradation lines can be used by the operator to compensate the vertical position of the sighting axis 112 for distances other than the distance of calibration for point A. If a significant vertical parallax condition existed such gradation lines would be of diminished value.

In order to calibrate a rifle for use with an optical gun sight some means must be provided to vary the position of the final image of the sighted target and/or reticle pattern relative to the axis of the barrel of the rifle to compensate for the trajectory of the bullet. As noted, frequently this is accomplished by an external mechanism which permits horizontal and vertical movement of the entire housing and lens system relative to the line or firing axis of the rifle barrel. Other constructions have used internal adjustment means in the scope whereby the received image can be moved relative to the final image viewed by the eye. In both cases, however, the results have been bulky and/or lengthy, heavy constructions. In the present invention, the calibrating movement is provided by moving the image erector system which is generally located at the focal plane of the telescope via a pair of axes located at the theoretical or effective focal plane. The result as has been shown is a compact, lightweight structure.

Thus the image erector system 100 is supported by the prism housing 102 with its spherical bearing portion 106 which in combination with the spherical seat 96 defines a spherical bearing by which the image erector system 100 can be articulated vertically and/or horizontally to provide the desired calibration for alignment purposes. The calibration and alignment are facilitated by a pair of adjustment assemblies 136 located in quadrature with each other for providing separate vertical and horizontal adjustments. The general construction and operation of adjustment assemblies, such as adjustment assembly 136, are known in the art.

Figure 6:
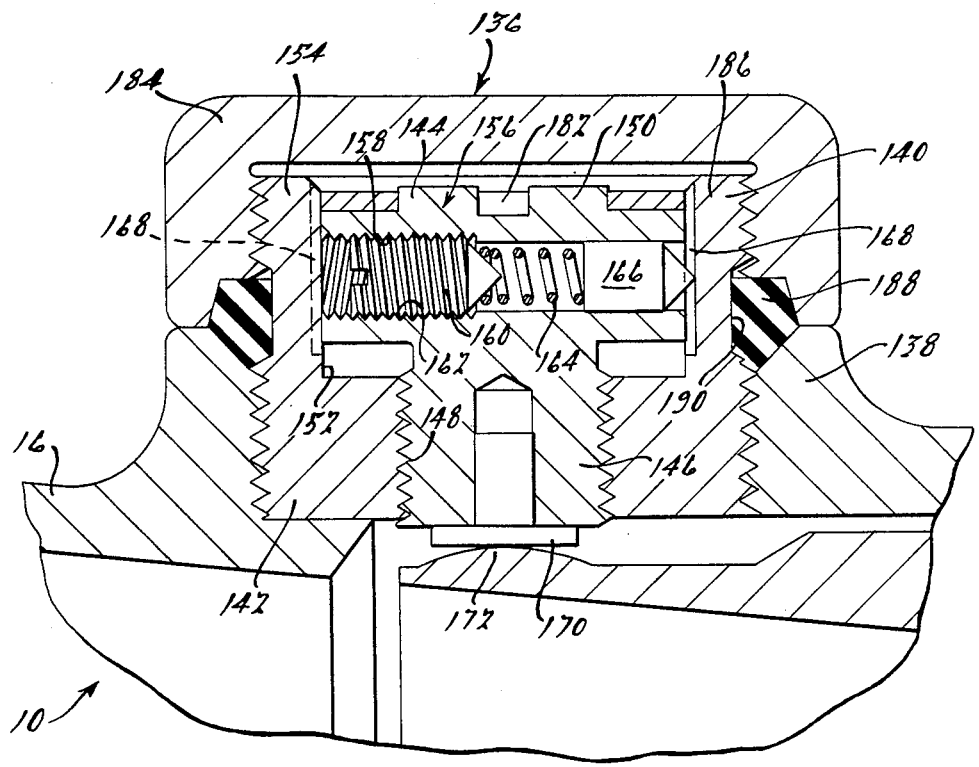
FIG. 6 is a fragmentary, sectional view to enlarged scale of the adjustment assembly of the optical gun sight of FIGS. 1, 2 and 3 taken generally along the lines 6—6 in FIG. 2.

Looking now to FIGS. 2, 3 and 6, the main housing 16 has a pair of internally threaded bosses 138 adapted to receive the adjustment assemblies 136. The adjustment assembly 136 includes a hollow adaptor 140 which is externally threaded at its inner end 142 to be threadably received within the threaded boss 138. A plug 144 has a threaded, small diameter portion 146 which is threadably received within a reduced diameter threaded bore 148 at the inner end 142 of the adapter 140. The plug 144 has an enlarged head portion 150 generally located within an enlarged bore 152 at the outer end 154 of the adapter 140. A detent assembly 156 is located in a radial cross bore 158 through the head portion 150 of plug 144. The detent assembly 156 includes an adjustment screw 160 threadably movable within a threaded portion 162 of cross bore 158 and a bias spring 164 which is operative on a detent pin 166. The enlarged bore 152 is provided with a plurality of axially extending grooves 168 which are circumferentially located at preselected, equally spaced intervals. The bias on spring 164 urges the detent pin 166 outwardly from the cross bore 158 into engagement with the side wall of the enlarged bore 152 such that upon threadably advancing or retracting the plug 144 discernible physical and/or audible 'clicks' can be sensed by the operator as the detent pin 166 moves into an adjacent groove 168 to facilitate calibration.

The plug 144 is provided with an engaging pin 170 at its inner most end which pin 170 is adapted to engage a raised cylindrical portion 172 at the forward end of the prism housing 102. To this end the prism housing 102 is provided with four raised, generally cylindrical portions 172 located in quadrature with each other such that two of the raised portions will be in line with the adjustment assemblies 136. Diametrically opposite each of the adjustment assemblies 136 are bias assemblies 174 which operate against associated ones of the raised portions 172 to continually bias the opposite ones of the raised portions 172 against the engaging pins 170. The bias assists in maintaining the desired vertical and horizontal orientation of the prism housing 102 and hence of the prism assembly 114. In this regard while the upper surfaces of the cylindrical portions 172 are curved in the longitudinal or axial direction of the axis 112 they are generally straight and have no curvature across their width W1 extending transversely to the central axis 112.

The bias assemblies 174 are located in bores 176 in the main housing 16 and include a spring member 178 and a spring cap 180 which is adapted to engage the associated raised portion 172 in response to the bias on the spring member 178. Thus the vertical and horizontal positions of the prism housing 102 can be selectively adjusted by threading the plug 144 inwardly or outwardly with the calibration being facilitated by the discernible 'clicks' provided by the detent assemblies 156. Note that the bias of the detent assemblies 156 in the grooves 168 also helps to maintain the selected vertical and horizontal adjustment by resisting self turning of the plug 144. The plug 144 is provided with a cross slot 182 in its enlarged head portion 150 to facilitate adjustment with a screw driver like element.

In order to seal the main housing 16, the adjustment assembly 136 is provided with a cap 184 which is threadably engageable with an externally threaded outer end 186 of adapter 140 (see FIG. 6). An annular seal 188 is located on a smooth, intermediate portion 190 on adapter 140 and provides the desired seal for the adjustment assembly 136 and the main housing 16.

The seals 58, 70, 88 and 188 can be of a design and type selected by those skilled in the art; however, in a preferred form, standard, industrial sized seals of 1.78 millimeters of minimum diameter were used. The seals were in accordance with Military Specification MIL-R-25988, Type 1, Class 1, Grade 70 according to AMS3304. Silicone rubber was selected for operation in the extreme hot and cold temperature.

Thus it can be seen that calibration can be readily provided by simply rotating the image erector system 100 via the spherical bearing assembly as noted. In addition since the reticle projecting structure 128 is integrally connected with the prism assembly 114 movement of the prism assembly 114 and prism housing 102 will result in a similar movement of the reticle projecting structure 128 and its associated illumination source 132. In this regard it should be noted that calibration is effected by moving the image relative to firing axis 169 of the rifle 14 with the reticle pattern 130 remaining in the same position relative to the scope axis 112, i.e. traditionally in the center of the image viewed by the operator through the ocular lens system 64. Note that location of the received image at the theoretical or effective focal plane 98 in the plane 97 of the center of rotation X for the spherical bearing about the two axes 108 and 110 enhances the accuracy of the calibration. Likewise location of the plane of the mirrored surface "g", which receives the focused image and generates the reticle pattern 130, at or proximate to the plane 97 of the center of rotation X of the spherical bearing assembly enhances the accuracy of calibration. Thus accurate calibration will result from the selective, adjustment movement of the final image and reticle pattern 130 as observed through the ocular lens system 64.

It should be noted that for convenience the calibration adjustment has been referred to as being in vertical and horizontal directions; more generally, the calibration is provided in two transverse directions which in turn are transverse to the central axis 112 of the housing assembly, i.e. housings 16 and 18, to permit adjustment of the position of the image of the target and reticle pattern 130 relative to the firing axis 169 of the barrel 49 (partially shown) of the rifle 14 whereby compensatin can be provided for the trajectory of the bullet to the target.

In one form of the invention the objective lens system 46 and ocular lens system 64 were selected to provide a telescopic effect with a magnification ratio of four to one; however, it should be noted that the principles of the present invention are readily applicable to optical gun sights of different magnification ratios including one to one.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is

1. An optical gun sight for attachment to a manually portable gun having a firing axis comprising:
   tubular housing means having a generally elongated and hollow housing section for receiving a target to be sighted at its forward end and for viewing an image of such target at its rearward end,
   said tubular housing means having a central axis,
   said tubular housing means having securing section means for securing said gun sight to the gun,
   objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means having a plurality of light transmitting and reflective surfaces including a first and a second of said surfaces being axially spaced along said central axis and defining the axially extending length of said image erector means, said image erector means operatively associated with said objective lens means for receiving the image of the target from said objective lens means and for providing and locating the image of the target at said preselected plane at said predetermined location within said axially extending length of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target.

2. The optical gun sight of claim 1 further comprising:

reticle projecting means for providing a reticle pattern with the image of the target from said objective lens means, said reticle projecting means being supported for movement with said image erector means, said reticle projecting means located within said axially extending length of said image erector means.

3. The optical gun sight of claim 1 further comprising:

reticle projecting means for providing a reticle pattern with the image of the target from said objective lens means, said reticle projecting means being supported for movement with said image erector means, said reticle projecting means located within said axially extending length of said image erector means, illumination means illuminating said reticle pattern and connected with said reticle projecting means for movement with said image erector means.

4. The optical gun sight of claim 1 further comprising:

said image erector means including prism means located at said preselected plane for providing a substantially focused image at said preselected plane and for providing the properly oriented image of the target to the viewer through said ocular lens means, and said prism means having said light transmitting and reflective surfaces.

5. The optical gun sight of claim 1 further comprising:

said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said reticle projecting means located within said axially extending length of said image erector means, said reticle projecting means being supported for movement with said image erector means.

6. The optical gun sight of claim 1 further comprising:

said image erector means including prism means located at said preselected plane for providing a substantially focused image at said preselected plane and for providing the properly oriented image of the target to the viewer through said ocular lens means, said prism means having said light transmitting and reflective surfaces, reticle projecting means for providing a reticle pattern with the image of the target from said objective lens means, said reticle projecting means being supported for movement with said image erector means, said reticle projecting means located within said axially extending length of said image erector means, said prism means comprising a roof prism and a helper prism.

7. The optical gun sight of claim 1 further comprising:

said image erector means including prism means located at said preselected plane for providing a substantially focused image at said preselected plane and for providing the properly oriented image of the target to the viewer through said ocular lens means, said prism means having said light transmitting and reflective surfaces, reticle projecting means for providing a reticle pattern with the image of the target from said objective lens means, said reticle projecting means being supported for movement with said image erector means, said reticle projecting means located within said axially extending length of said image erector means, ilumination means for illuminating said reticle pattern and connected with said reticle projecting means for movement with said image erector means.

8. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said reticle projecting means being supported for movement with said image erector means, said prism means comprising a plurality of reflecting and transmitting prism surfaces, said reticle projecting means comprising a mirror surface on one of said prism surfaces with said mirror surface including said reticle pattern.

9. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preslected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantialy focused image at said preselected plane and for providing the properly oriented image of the target to the viewer through said ocular lens means, reticle projecting means for providing a reticle pattern with the image of the target from said objective lens means, said reticle projecting means being supported for movement with said image erector means, said prism means comprising a plurality of reflecting and transmitting prism surfaces, said reticle projecting means comprising a mirror surface on one of said prism surfaces with said mirror surface including said reticle pattern, said prism means providing a substantially focused image of the sighted target on said mirror surface of said reticle projecting means.

10. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said reticle projecting means being supported for movement with said image erector means, said prism means comprising a roof prism and a helper prism, said helper prism having a plurality of prism surfaces, said reticle projecting means comprising a mirror surface on one of said prism surfaces with said mirror surface including said reticle pattern.

11. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said reticle projecting means being supported for movement with said image erector means, said prism means comprising a roof prism and a helper prism, said helper prism having a plurality of prism surfaces, said reticle projecting means comprising a mirror surface on one of said prism surfaces with said mirror surface including said reticle pattern, said roof prism and said helper prism oriented such that said roof prism is closest to said objective lens means and first receives the image of the target from said objective lens means.

12. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said reticle projecting means being supported for movement with said image erector means, said prism means comprising a roof prism and a helper prism, said helper prism having a plurality of prism surfaces said reticle projecting means comprising a mirror surface on one of said prism surfaces with said mirror surface including said reticle pattern, said prism means providing a substantially focused image of the sighted target on said mirror surface of said reticle projecting means.

13. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said reticle projecting means being supported for movement with said image erector means, said prism means comprising a roof prism and a helper prism, said helper prism having a plurality of prism surfaces, said reticle projecting means comprising a mirror surface on one of said prism surfaces with said mirror surface including said reticle pattern, said prism means providing a substantially focused image of the sighted target on said mirror surface of said reticle projecting means, said roof prism and said helper prism oriented such that said roof prism is closest to said objective lens means and first receives the image of the target from said objective lens means.

14. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said prism means comprising a plurality of reflecting and transmitting prism surfaces, said reticle projecting means comprising a mirror surface on one of said prism surfaces, illumination means for illuminating said reticle pattern and connected with said mirror surface for movement therewith.

15. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said prism means comprising a plurality of reflecting and transmitting prism surfaces, said prism means comprising a roof prism and a helper prism, said prism surfaces being defined by surfaces on said roof prism and said helper prism, said reticle projecting means comprising a mirror surface on one of said prism surfaces on said helper prism, illumination means for illuminating said reticle pattern and connected with said mirror surface for movement therewith.

16. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said prism means comprising a plurality of reflecting and transmitting prism surfaces, said prism means comprising a roof prism and a helper prism, said prism surfaces being defined by surfaces on said roof prism and said helper prism, said reticle projecting means comprising a mirror surface on one of said prism surfaces on said helper prism, illumination means for illuminating said reticle pattern and connected with said mirror surface for movement therewith, said prism means providing a substantially focused image of the sighted target on said mirror surface of said reticle projecting means.

17. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said prism means comprising a plurality of reflecting and transmitting prism surfaces, said prism means comprising a roof prism and a helper prism, said prism-surfaces being defined by surfaces on said roof prism and said helper prism, said reticle projecting means comprising a mirror surface on one of said prism surfaces on said helper prism, illumination means for illuminating said reticle pattern and connected with said mirror surface for movement therewith, said prism means providing a substantially focused image of the sighted target on said mirror surface of said reticle projecting means, said illumination means located behind said reticle pattern for projecting said reticle pattern substantially in the same direction of reflection of said focused image from said mirror surface.

18. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said prism means comprising a plurality of reflecting and transmitting prism surfaces, said prism means comprising a roof prism and a helper prism, said prism surfaces being defined by surfaces on said roof prism and said helper prism, said reticle projecting means comprising a mirror surface on one of said prism surfaces on said helper prism, illumination means for illuminating said reticle pattern and connected with said mirror surface for movement therewith, said prism means providing a substantially focused image of the sighted target on said mirror surface of said reticle projecting means, said illumination means comprising day illumination means including a light collecting and transmitting rod located at a forward portion of said hollow housing section and extending into said hollow housing section at a position proximate to the back of said mirror surface and including a flexible fiber optic connected to said collecting rod and communicating the collected light to a preselected position behind said reticle pattern.

19. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said prism means comprising a plurality of reflecting and transmitting prism surfaces, said prism means comprising a roof prism and a helper prism, said prism surfaces being defined by surfaces on said roof prism and said helper prism, said reticle projecting means comprising a mirror surface on one of said prism surfaces on said helper prism, illumination means for illuminating said reticle pattern and connected with said mirror surface for movement therewith, said prism means providing a substantially focused image of the sighted target on said mirror surface of said reticle projecting means, said illumination means comprising day illumination means including a light collecting and transmitting rod located at a forward portion of said hollow housing section and extending into said hollow housing section at a position proximate to the back of said mirror surface and including a flexible fiber optic connected to said collecting rod and communicating the collected light to a preselected position behind said reticle pattern, said tubular housing means comprising a main housing and an eyepiece housing removably connected together generally at the location of said image erector means, said light rod collecting light over its exposed length with said exposed length being greater than around 50% of the axial length of said main housing.

20. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said prism means comprising a plurality of reflecting and transmitting prism surfaces, said prism means comprising a roof prism and a helper prism, said prism surfaces being defined by surfaces on said roof prism and said helper prism, said reticle projecting means comprising a mirror surface on one of said prism surfaces on said helper prism, illumination means for illuminating said reticle pattern and connected with said mirror surface for movement therewith, said prism means providing a substantially focused image of the sighted target on said mirror surface of said reticle projecting means, said illumination means comprising day illumination means including a light collecting and transmitting rod located at a forward portion of said hollow housing section and extending into said hollow housing section at a position proximate to the back of said mirror surface and including a flexible fiber optic connected to said collecting rod and communicating the collected light to a preselected position behind said reticle pattern, said tubular housing means comprising a main housing and an eyepiece housing removably connected together generally at the location of said image erector means, said light rod collecting light over its exposed length with said exposed length being between around 70% to 90% of the axial length of said main housing.

21. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means, said prism means comprising a plurality of reflecting and transmitting prism surfaces, said prism means comprising a roof prism and a helper prism, said prism surfaces being defined by surfaces on said roof prism and said helper prism, said reticle projecting means comprising a mirror surface on one of said prism surfaces on said helper prism, illumination means for illuminating said reticle pattern and connected with said mirror surface for movement therewith, said prism means providing a substantially focused image of the sighted target on said mirror surface of said reticle projecting means, said illumination means comprising day illumination means including a light collecting and transmitting rod located at a forward portion of said hollow housing section and extending into said hollow housing section at a position proximate to the back of said mirror surface and including a fiber optic connected to said collecting rod and communicating the collected light to a preselected position behind said reticle pattern, a transparent shield secured to said housing means and overlaying and protecting said collecting rod.

22. An optical gun sight for attachment to a manually portable gun having a firing axis comprising:

tubular housing means having a generally elongated and hollow housing section for receiving a target to be sighted at its forward end and for viewing an image of such target at its rearward end, said tubular housing means having a central axis, said tubular housing means having securing section means for securing said gun sight to the gun, objective lens means located at said forward end of said hollow housing section for receiving the target to be sighted and for providing a substantially focused image of the target at a preselected plane at a predetermined location within said hollow housing section, ocular lens means located at said rearward end of said hollow housing section for viewing an image of such target, image erector means located within said hollow housing section intermediate said objective lens means and said ocular lens means for providing a properly oriented image of the target to the viewer through said ocular lens means, said image erector means operatively associated with said objective lens means for receiving the image of the target from said objective lens means and for providing and locating the image of the target at said preselected plane within the confines of said image erector means and providing a properly oriented image of the target to the viewer through said ocular lens means, internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target, said image erector means including prism means located at said preselected plane for providing a substantially focused image at said preselected plane and for providing the properly oriented image of the target to the viewer through said ocular lens means, reticle projecting means for providing a reticle pattern with the image of the target from said objective lens means,
said reticle projecting means being supported for movement with said image erector means,
said prism means comprising a plurality of reflecting and transmitting prism surfaces,
said reticle projecting means comprising a mirror surface on one of said prism surfaces with said mirror surface including said reticle pattern,
said prism means providing a substantially focused image of the sighted target on said mirror surface of said reticle projecting means,
said mirror surface being generally vertical and said reticle projecting means providing at least a vertically extending pattern which is substantially parallax free, with said vertically extending pattern having vertically spaced gradations for assistance in compensation for distances other than that for which said optical gun sight is calibrated.

23. An optical gun sight for attachment to a manually portable gun having a firing axis comprising:
tubular housing means having a generally elongated and hollow housing section for receiving a target to be sighted at its forward end and for viewing an image of such target at its rearward end,
said tubular housing means having a central axis,
said tubular housing means having securing section means for securing said gun sight to the gun,
objective lens means located at said forward end of said hollow housing section for receiving the target to be sighted and for providing a substantially focused image of the target at a preselected plane at a predetermined location within said hollow housing section,
ocular means located at said rearward end of said hollow housing section for viewing an image of such target,
image erector means located within said hollow housing section intermediate said objective lens means and said ocular means for providing a properly oriented image of the target to the viewer through said ocular lens means,
said image erector means having a plurality of light transmitting and reflective surfaces including a first and a second of said surfaces being axially spaced along said central axis and defining the axially extending length of said image erector means,
said image erector means operatively associated with said objective lens means for receiving the image of the target from said objective lens means and for providing and locating the image of the target at said preselected plane at said predetermined location within said axially extending length of said image erector means and providing a properly oriented image of the target to the viewer through said ocular lens means,
internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target,
said internal adjustment means comprising support housing means for supporting said image erector means and further comprising a spherical bearing structure for connecting said support housing means with said tubular housing means for selective movement of said image erector means in said two transverse directions,
said first and second of said surfaces of said image erector means being generally axially located within the confines of said spherical bearing structure.

24. An optical gun sight for attachment to a manually portable gun having a firing axis comprising:
tubular housing means having a generally elongated and hollow housing section for receiving a target to be sighted at its forward end and for viewing an image of such target at its rearward end,
said tubular housing means having a central axis,
said tubular housing means having securing section means for securing said gun sight to the gun,
objective lens means located at said forward end of said hollow housing section for receiving the target to be sighted and for providing a substantially focused image of the target at a preselected plane at a predetermined location within said hollow housing section,
ocular means located at said rearward end of said hollow housing section for viewing an image of such target,
image erector means located within said hollow housing section intermediate said objective lens means and said ocular lens means for providing a properly oriented image of the target to the viewer through said ocular lens means,
said image erector means operatively associated with said objective lens means for receiving the image of the target from said objective lens means and for providing and locating the image of the target at said preselected plane within the confines of said image erector means and providing a properly oriented image of the target to the viewer through said ocular lens means,
internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target,
said internal adjustment means comprising support housing means for supporting said image erector means and further comprising a spherical bearing structure for connecting said support housing means with said tubular housing means for selective movement of said image erector means in said two transverse directions,
said image erector means comprising a prism assembly,
said support housing means including a prism housing for supporting said prism assembly generally at said preselected plane,
said hollow housing section including a forward housing member for supporting said objective lens means and a rearward housing member for supporting said ocular lens means,
said spherical bearing structure being defined by cooperating surfaces on said prism housing and said forward and rearward housing members.

25. The optical gun sight of claim 24 with said prism housing including a plurality of engaging surfaces located in quadrature with each other,
   said internal adjustment means further including adjustment assemblies supported in said forward housing member and including radially movable adjustment members engageable with said engaging surfaces for providing selective movement of said prism housing and hence of said prism assembly in said two transverse directions by means of said spherical bearing.

26. An optical gun sight for attachment to a manually portable gun having a firing axis and having a barrel comprising:
   tubular housing means having a generally elongated and hollow housing section for receiving a target to be sighted at its forward end and for viewing an image of such target at its rearward end,
   said tubular housing means having a central axis,
   said tubular housing means having securing section means for securing said gun sight to the gun,
   objective lens means located at said forward end of said hollow housing section for receiving the target to be sighted and for providing a substantially focused image of the target at a preselected plane at a predetermined location within said hollow housing section,
   ocular lens means located at said rearward end of said hollow housing section for viewing an image of such target,
   image erector means located within said hollow housing section intermediate said objective lens means and said ocular lens means for providing a properly oriented image of the target to the viewer through said ocular lens means,
   said image erector means operatively associated with said objective lens means for receiving the image of the target from said objective lens means and for providing and locating the image of the target at said preselected plane within the confines of said image erector means and providing a properly oriented image of the target to the viewer through said ocular lens means,
   internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target,
   said internal adjustment means comprising support housing means for supporting said image erector means and further comprising a spherical bearing structure for connecting said support housing means with said tubular housing means for selective movement of said image erector means in said two transverse directions,
   said tubular housing means having longitudinally extending bore means under said hollow housing section for permitting sighting along the barrel independently of sighting through the lens system of said optical gun sight.

27. An optical gun sight for attachment to a manually portable gun having a firing axis comprising:
   tubular housing means having a generally elongated and hollow housing section for receiving a target to be sighted at its forward end and for viewing an image of such target at its rearward end,
   said tubular housing means having a central axis,
   said tubular housing means having securing section means for securing said gun sight to the gun,
   objective lens means located at said forward end of said hollow housing section for receiving the target to be sighted and for providing a focused image of the target at a preselected plane at a predetermined location within said hollow housing section,
   ocular lens means located at said rearward end of said hollow housing section for viewing an image of such target,
   image erector means located within said hollow housing section intermediate said objective lens means and said ocular lens means for providing a properly oriented image of the target to the viewer through said ocular lens means,
   said image erector means operatively associated with said objective lens means for receiving the image of the target from said objective lens means and for providing and locating the image of the target at said preseleced plane within the confines of said image erector means and providing a properly oriented image of the target to the viewer through said ocular lens means,
   said tubular housing section comprising a forward housing member having a forward connecting portion and a rearward housing member having a rearward connecting portion,
   connecting means for connecting said forward and rearward housing members together at said forward and rearward connecting portions,
   said forward and rearward housing members having generally spherically contoured internal surfaces located generally at said forward and rearward connecting portions for defining a spherically contoured bearing seat,
   said image erector means comprising a prism assembly, prism housing means operatively associated with said image erector means for securing said prism assembly within said tubular housing section,
   said prism housing means having a generally spherically contoured external surface adapted to be matably received within said spherical bearing seat to define therewith a spherical bearing,
   said prism assembly being located at said preselected plane by said prism housing means and said spherical bearing seat,
   internal adjustment means including said spherical bearing operable with said prism housing means for providing selective movement of said prism housing means via said spherical bearing and hence of said prism assembly in two transverse directions which are in turn transverse to said central axis of said tubular housing means to permit calibration of the position of the image of the target relative to the firing axis of the gun whereby compensation can be provided for the trajectory of the bullet to the target.

28. The optical gun sight of claim 27 with said prism housing including a plurality of engaging surfaces located in quadrature with each other,
   said internal adjustment means further including adjustment assemblies supported in said forward housing member and including radially movable adjustment members engageable with said engaging surfaces for providing selective movement of said prism housing and hence of said prism assembly in said two transverse directions by means of said spherical bearing.

29. The optical gun sight of claim 27 with said prism assembly including a roof prism and a helper prism,
said prism housing means being generally tubular in construction and having a rearward portion having a circumferential opening with a web extending longitudinally, diagonally across said circumferential opening,
said roof prism and said helper prism being supported in spaced relationship on opposite sides of said web.

30. The optical gun sight of claim 29 with said prism housing including a plurality of engaging surfaces located in quadrature with each other,
said internal adjustment means further including adjustment assemblies supported in said forward housing member and including radially movable adjusting members engageable with said engaging surfaces for providing selective movement of said prism housing and hence of said prism assembly in said two transverse directions by means of said spherical bearing.

31. The optical gun sight of claim 27 with the portable gun having a barrel and with said tubular housing means having longitudinally extending bore means under said hollow housing section for permitting sighting along the barrel independently of sighting through the lens system of said optical gun sight.

32. An optical gun sight for attachment to a manually portable gun having a firing axis comprising:
tubular housing means having a generally elongated and hollow housing section for receiving a target to be sighted at its forward end and for viewing an image of such target at its rearward end,
said tubular housing means having a central axis,
said tubular housing means having securing section means for securing said gun sight to the gun,
objective lens means located at said forward end of said hollow housing section for receiving the target to be sighted and for providing an image of the target at a preselected plane at a predetermined location within said hollow housing section,
ocular lens means located at said rearward end of said hollow housing section for viewing an image of such target,
image erector means located within said hollow housing section intermediate said objective lens means and said ocular lens means for providing a properly oriented image of the target to the viewer through said ocular lens means,
said image erector means operatively associated with said objective lens means for receiving the image of the target from said objective lens means and for providing and locating the image of the target at said preselected plane within the confines of said image erector means and providing a properly oriented image of the target to the viewer through said ocular lens means,
internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target,
said image erector means including prism means located at said preselected plane for providing a substantially focused image at said focal plane and for providing the properly oriented image of the target to the viewer through said ocular lens means,
reticle projecting means for providing a reticle pattern with the image of the target from said objective lens means,
said reticle projecting means comprising a mirror surface,
said prism means providing a substantially focused image of the sighted target on said mirror surface of said reticle projecting means,
said preselected plane being the plane of said mirror surface.

33. The optical gun sight of claim 32 further comprising:
said prism means comprising a plurality of reflecting and transmitting prism surfaces, and
said mirror surface being one of said prism surfaces with said mirror surface including said reticle pattern.

34. An optical gun sight for attachment to a manually portable gun having a firing axis comprising:
tubular housing means having a generally elongated and hollow housing section for receiving a target to be sighted at its forward end and for viewing an image of such target at its rearward end,
said tubular housing means having a central axis,
said tubular housing means having securing section means for securing said gun sight to the gun,
objective lens means located at said forward end of said hollow housing section for receiving the target to be sighted and for providing an image of the target at a preselected plane at a predetermined location within said hollow housing section,
ocular lens means located at said rearward end of said hollow housing section for viewing an image of such target,
image erector means located within said hollow housing section intermediate said objective lens means and said ocular lens means for providing a properly oriented image of the target to the viewer through said ocular lens means,
said image erector means operatively associated with said objective lens means for receiving the image of the target from said objective lens means and for providing and locating the image of the target at said preselected plane within the confines of said image erector means and providing a properly oriented image of the target to the viewer through said ocular lens means,
internal adjustment means operative on said image erector means for selectively moving said image erector means in two transverse directions which are in turn transverse to said central axis of said tubular housing means to permit calibration of the position of the image of the target relative to the firing axis of the gun whereby compensation can be provided for the trajectory of the bullet to the target,
said image erector means including prism means located at said preselected plane for providing a substantially focused image at said focal plane and for providing the properly oriented image of the target to the viewer through said ocular lens means, reticle projecting means for providing a reticle pattern with the image of the target from said objective lens means, said reticle projecting means comprising a mirror surface, said prism means providing a substantially focused image of the sighted target on said mirror surface of said reticle projecting means, said preselected plane being the plane of said mirror surface, said mirror surface being generally vertical and said reticle projecting means providing at least a vertically extending pattern which is substantially parallax free, with said vertically extending pattern having vertically spaced gradations for assistance in compensation for distances other than that for which said optical gun sight is calibrated.

* * * * *

UNITED STATES PATENT AND TRADEMARK OFFICE
CERTIFICATE OF CORRECTION

PATENT NO. : 4,806,007

DATED : February 21, 1989

INVENTOR(S) : Glyn A. J. Bindon

It is certified that error appears in the above-identified patent and that said Letters Patent is hereby corrected as shown below:

Column 4, line 50, delete "he" and substitute therefor --the--

Column 8, line 10, delete "substantally" and substitute therefor --substantially--

Column 10, line 37, delete "compensatin" and substitute therefor --compensation--

Column 14, line 12, claim 9, delete "substantialy" and substitute therefor --substantially--

Column 28, line 25, claim 24, after "ocular" insert --lens--.

Signed and Sealed this

Twenty-third Day of January, 1990

Attest:

JEFFREY M. SAMUELS

Attesting Officer   Acting Commissioner of Patents and Trademarks